(No Model.) 2 Sheets—Sheet 1.

M. L. TINKCOM.
TRUNK.

No. 575,444. Patented Jan. 19, 1897.

Witnesses.
F. L. Oyrand
J. B. Smith

Inventor.
Martin L. Tinkcom
By H. Blurison
Attorney.

(No Model.) 2 Sheets—Sheet 2.

M. L. TINKCOM.
TRUNK.

No. 575,444. Patented Jan. 19, 1897.

Witnesses.
F. L. Durand
A. B. Suit

Inventor.
Martin L. Tinkcom
By J. H. B. Willson
Attorney

UNITED STATES PATENT OFFICE.

MARTIN L. TINKCOM, OF EAU CLAIRE, WISCONSIN.

TRUNK.

SPECIFICATION forming part of Letters Patent No. 575,444, dated January 19, 1897.

Application filed April 7, 1896. Serial No. 586,586. (No model.)

*To all whom it may concern:*

Be it known that I, MARTIN L. TINKCOM, a citizen of the United States, residing at Eau Claire, in the county of Eau Claire and State of Wisconsin, have invented certain new and useful Improvements in Trunks; and I do declare the following to be a full, clear, and exact description of the invention, such as will enable others skilled in the art to which it appertains to make and use the same.

My invention has relation to trunks, and the object is to provide a novel form of tray combined with a trunk, so that access may conveniently be had to the contents of either; and to this end the novelty consists in the construction, combination, and arrangement of the same, as will be hereinafter more fully described, and particularly pointed out in the claim.

In the accompanying drawings the same letters of reference indicate like parts of the invention.

Figure 1:
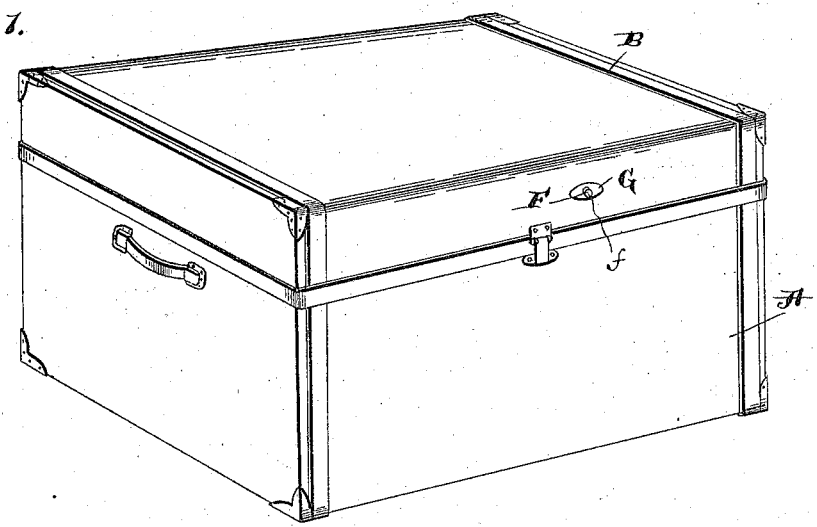
Figure 2:
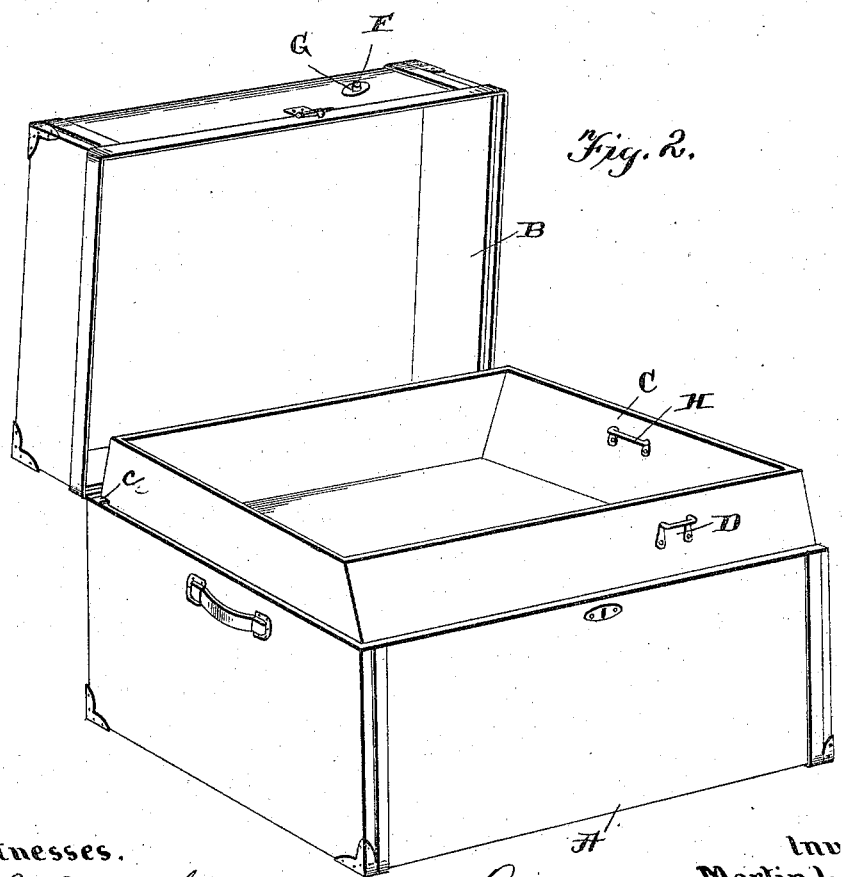
Figure 3:
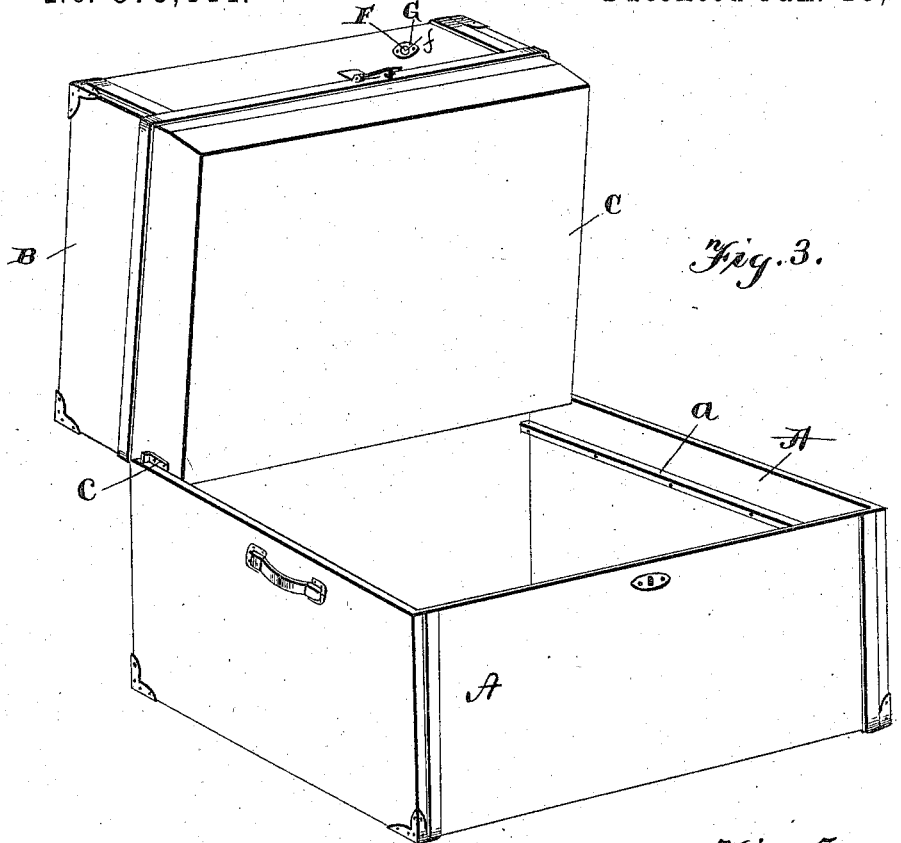
Figures 4, 5:
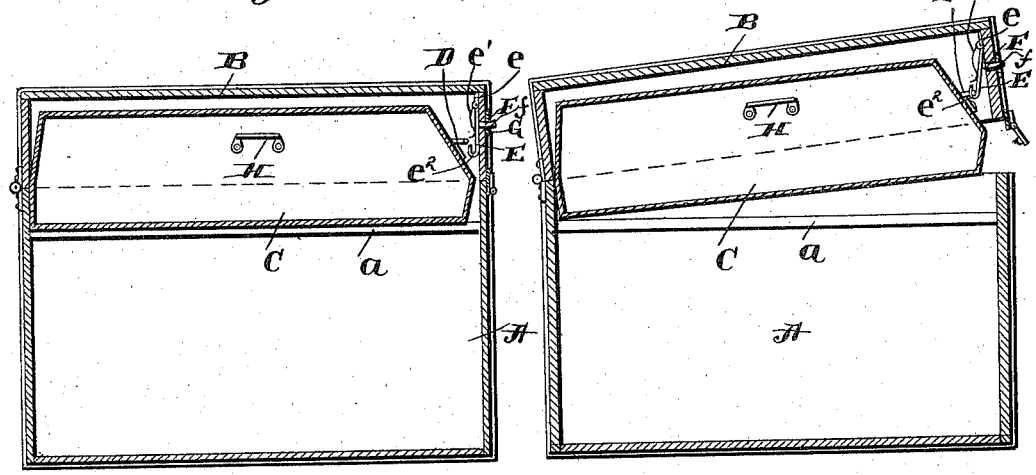

Figure 1 is a view in perspective of my improved trunk as it appears closed. Fig. 2 is a similar view with the lid raised. Fig. 3 is a similar view of the lid and tray raised. Fig. 4 is a transverse section of the trunk closed. Fig. 5 is a view with the button pushed in to raise the tray when the lid is raised.

A is the body of the trunk, and B the lid or cover. C is the tray, and it rests on cleats $a$ $a$, extending across the ends of the body A on the inside thereof, and the rear ends of the tray are provided with rigid arms $c$ $c$, resting on the top edge of the ends of the body A.

D is a staple secured to the front of the tray, and E is a depending hook hinged to a bracket $e$, secured to the inside of the front of the lid B, and it is provided with a flat spring $e'$, which presses against the shank of the hook E to hold it flat against the inside of the front of the lid, so as to prevent its end $e^2$ from coming in contact with the staple D.

A push-button F is secured to the hook E, extending through the front of the lid, its end $f$ projecting a short distance through the escutcheon G.

It will be seen that if the lid be raised without pressing the end $f$ of the button F the tray will remain in the body portion A and access may be had to the contents of the tray C, but if the end of the push-button F be pushed in while the lid is raised the tray will be raised by the lid, the arms $c$ $c$ acting as hinges, which will support the tray in a vertical position, and the tray being detachable when it is in the position shown in Fig. 2 it may be lifted clear of the trunk by the handles H H.

In practice it is not necessary to make the hook E, bracket $e$, and spring $e'$ of separate pieces, but the whole may be made of a single piece of spring sheet metal.

Having thus described my invention, what I claim, and desire to secure by Letters Patent, is—

A trunk-body A having the removable tray C provided with arms $c$ $c$ and the staple D, in combination with the hinged lid B, provided with the bracket $e$ having the hinged hook E formed with an inwardly-projecting end $e^2$ and the flat spring $e'$ secured to said bracket $e$ and adapted to normally keep the end of the hinged hook out of engagement with the staple on the lid except when operated by the push-button F, substantially as and for the purpose set forth.

In testimony whereof I hereunto affix my signature in presence of two witnesses.

MARTIN L. TINKCOM.

Witnesses:
JOHN HUEBSCH,
WILLIAM HUEBSCH.